United States Patent [19]

James

[11] Patent Number: 4,841,515
[45] Date of Patent: Jun. 20, 1989

[54] READ-WRITE OPTICAL DISK

[75] Inventor: Wesley James, Brooklyn, N.Y.

[73] Assignee: Micronic Interface Technologies, New York, N.Y.

[21] Appl. No.: 68,923

[22] Filed: Jul. 1, 1987

[51] Int. Cl.$^4$ .............................................. G11B 7/24
[52] U.S. Cl. .................................... 369/100; 369/275; 369/288
[58] Field of Search ....................... 369/44, 45, 46, 99, 369/100, 109, 275, 288

[56] References Cited

U.S. PATENT DOCUMENTS 4,611,317  9/1986  Takeuchi et al. ..................... 369/45

Primary Examiner—Frank González
Attorney, Agent, or Firm—Israel Nissenbaum

[57] ABSTRACT

A read-write optical disk with method of manufacture and configuration of writing mechanism. The optical disk is fully configured at every readable location with pits filled with a stable, cyclable, solid-liquid (or solid-fluid) phase-change material, such as a paraffin mineral oil fraction, having a specific reflectivity when in the solid state, and a layer of a particulate metallic material capable of being magnetically attracted or repelled and having a reflective value significantly different from that of the phase-change material. The writing mechanism includes laser light amplification means to provide sufficient heat from the laser, which is used in the reading mode, to effect the solid-liquid phase change. The writing mechanism further includes a material-moving magnetic element. During operation of the write cycle, the phase-change material, in selected pits, is fluidized and is in the fluid state while a magnetic field is applied to the pit area. As a result, the layer of particulate metallic material is magnetically moved through the fluidized phase-change material, either into or out of exposure to the laser used in the reading mode, thereby providing a significant change of reflectivity of the exposed surface of the individual pits.

19 Claims, 3 Drawing Sheets

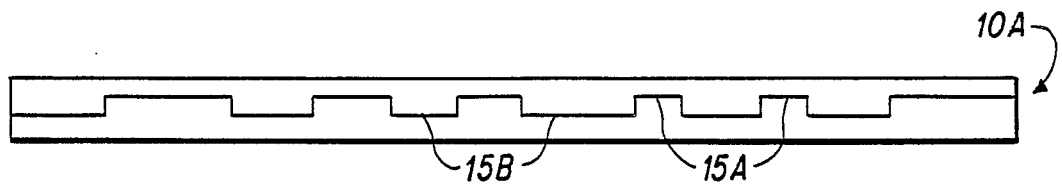
0000010000000100001000010001000100000010010000100100001000000
FIG. 3b (PRIOR ART)
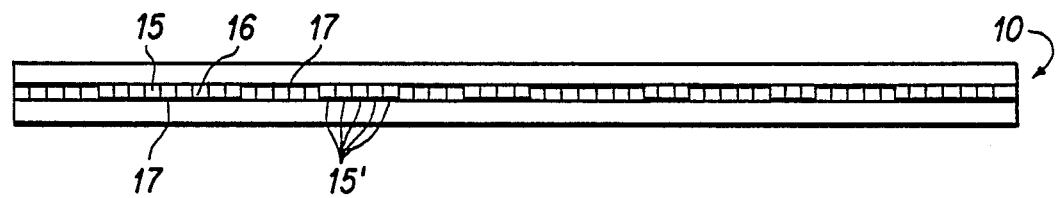
FIG. 3a
| FIRST PASS: ERASING | SECOND PASS: WRITING |
|---|---|
| ↓ | ↓ |
| LASER LIGHT ON PITS | LASER LIGHT ON PITS TO BE CHANGED FROM LAND STATE |
| ↓ | ↓ |
| THROUGH CHARGED LENS TO MELT PARAFFIN | THROUGH CHARGED LENS TO MELT PARAFFIN |
| ↓ | ↓ |
| ELECTROMAGNET ON | ELECTROMAGNET ON |
| ↓ | ↓ |
| PARTICLES MOVED TO BOTTOM OF PITS THROUGH MELTED PARAFFIN | PARTICLES MOVED TO TOP OF PITS THROUGH MELTED PARAFFIN |
| ↓ | |
| LAND STATE | |
FIG. 4

READ-WRITE OPTICAL DISK

This invention relates to optical disks readable by laser reading devices and particularly relates to such optical disks which are capable of undergoing multiple writing cycles.

With the current state of tehnology there are two well known and accepted media for information storage, namely magnetic and optical storage systems. Magnetic systems, involve no significant non-reversible physical changes in the magnetic media and are essentially totally recyclable. Accordingly, computers, audio taper recorders, and video cassette recorders, which involve constant recordation and change of information, have utilized information storage media such as magnetic disks and tapers. However, an inherent drawback of the magnetic media is the limited amount of storage capability. This storage limitation results from the magnetic field being incapable of extremely fine focussing. As a result, information tracks must be separated by relatively large spacing with reduced storage capability. For example, a typical 5 and ⅜ inch magnetic floppy disk can store on the order of about a megabyte of information on both sides, as a physical maximum, with about 96 tracks per inch. Currently available removable sealed hard disks can efficiently store up to about 5 times this amount but at a substantially higher cost. While this was once considered to be a considerable amount it is relatively minuscule as compared to optical disks which are readable by laser reading devices. Optical disks have the capability of storing 1200 times the information of the 5 and ⅜ inch floppy disks on one side of the 4.72 inch optical disk, currently the standard for audio compact disks. This tremendous increase in storage capability, insignificant part, results from the exactitude of laser light focussing and tracking which permits on the order of about 16,000 tracks per inch.

Optical disks however have had the drawback that a non-reversible physical change in the disk medium has been generally required for information storage as opposed to the readily reversible alignment of magnetic dipoles in magnetic media. This physical change is commonly a non-reversible destructive one in which pits are physically stamped into a plastic substrate. The combination of pits and lands (original plastic surface areas with reflective backcoating) provide the readable differences in reflectivity and generate the "on-off" signals similar to those utilized with magnetic media. Unlike magnetic media, however, the on-off signals or binary 1's and 0's are represented by the transition between a pit and a land and the continuation or "run" of a land or pit respectively. More bits are required for user information than is the case with magnetic media, however, this is more than overwhelmingly compensated for by the enormously increased density of the adjacent tracks.

As a result of the non-reversible destructive writing of information, optical disks have generally only been utilized for fixed information (write once), most popularly in the form of audio "CD" disks and video disks having information or entertainment materials prerecorded thereon. Efforts are presently underway in trying to achieve reliable, high quality optical disks which are capable of undergoing multiple read-write cycles without significant degradation.

Three major read-write optical disks are currently being developed using, (a) magneto-optic (M-O), (b) phase-change (P-C) and c) dye polymer (D-P) materials. Such developments, however, suffer from various drawbacks including high costs, cycle and ambient condition instability and insufficient signal to noise ratio (SNR).

The M-O disk consists of a thin vertically magnetized film of a rare earth transition material alloyed with iron or cobalt. In a static condition the film's coercivity, or resistance to magnetic change is high but when heated by a laser pulse, the coercivity drops to a low point whereby it is susceptible to magnetic reversal by a very small bias field. The information is thereafter read from the disk on the basis of the difference of polarization between the magnetized and non-magnetized points on the film. Problems with low SNR and susceptibility to degradation by oxidation in moist air, as well as complications in sensing devices have arisen with the M-O disks.

P-C disks operate on the basis of the ability of thin films of chalcogenide alloys to be reversibly switched from cyrstalline to amorphous conditions with concomitant change in reflectivity. The crystal change is effected by a short, intense laser pulse on a selected spot whereby the crystalline structure is changed to the amorphous one. A longer, less intense pulse reverses the change. Though P-C disks provide high SNR, the materials are very sensitive to oxidation from moisture. In addition, since the crystal change is thermally activated, changes will proceed even at room temperatures, though at a much reduced rate. Fatigue for the crystalline structure is an additional concern with the P-C disks.

D-P disks are comprised of two bonded polymer layers with dye in the bottom layer (an elastomer) being heated by light from one laser, with resultant expansion and creation of a bump in the top layer (a thermoplastic). The bump is then locked in by cooling. The dye in the top layer responds to a different wavelength of a second laser, which relaxes the bump and erases it. Concerns with this system include the necessity for two lasers with added bulk and the more serious likely possibility of material fatigue.

It is an object of the present invention to provide an economical, reliable, and stable optical disk which is capable of efficiently undergoing numerous write cycles.

It is a further object of the present invention to provide such optical disk whereby it is compatible with and readable by existing read only laser disk devices.

It is another object of the present invention to provide a method for the manufacture of the aforementioned optical disks.

It is a still further object of the present invention to provide a writing apparatus for said optical disks which apparatus can be readily adjuncted to existing read only laser disk devices.

These and other objects, features and advantages of the present invention will become more evident from the following discussion and the drawings in which:

FIG. 3a is an enlarged section view of the optical disk of FIG. 1, taken along line 3—3, having "written" information thereon as compared to the same section of prior art optical disks, shown in FIG. 3b, having the same information written thereon;

Figure 5:
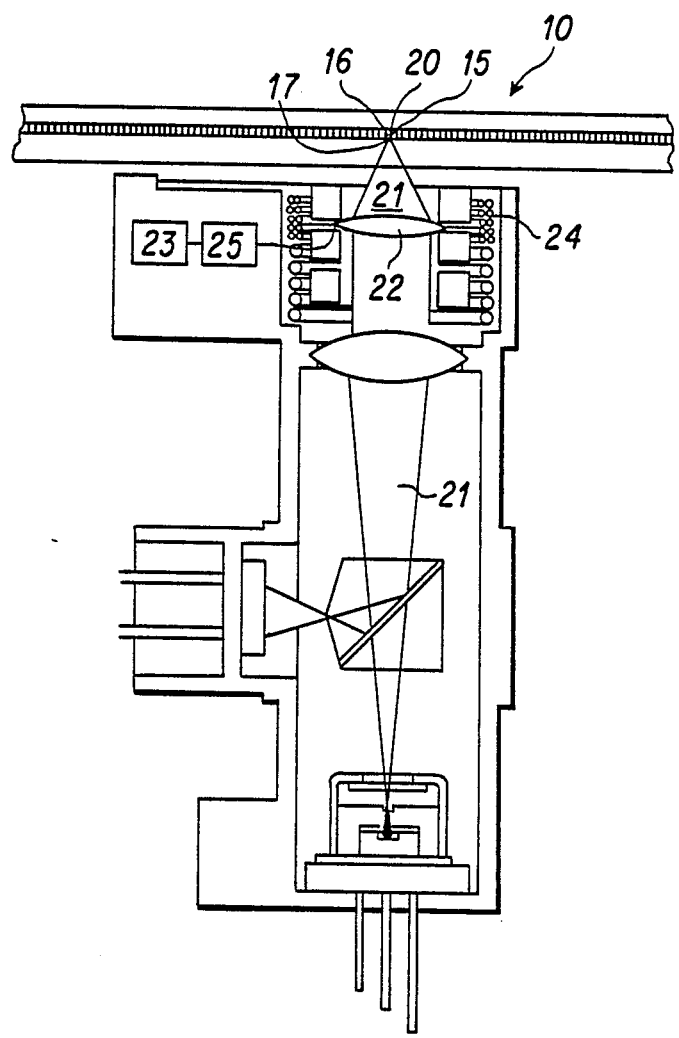

FIG. 4 schematically depicts the process of information writing on the disks of the present invention; and FIG. 5 is schematic view of a modified laser disk reading device having the writing apparatus of the present invention incorporated therein.

Generally the present invention comprises an optical disk having means therein for permitting multiple write cycles, a method for the production of the disk and an apparatus for writing on the disk. The optical disk undergoes a substantially fully reversible physical change without significant degradation of the disk. In addition, the disk is substantially unaffected by ambient conditions such as moisture or heat. The optical disk comprises means for permitting reversible changes in optical reflectivity by permitting the selective exposure of different material constituents, having significantly different reflectivities, to the laser used in the reading mode.

In accordance with the present invention, the disks are initially fully configured, at every available readible position, with pits. This is in contrast to existing commercial optical disks wherein only selected areas are stamped with ptis. The pits, in the disks of the present invention, have means therein for permitting reversible movement of the different materials into position for exposure to the laser, with concomitant change in reflectivity. In a preferred embodiment of the present invention, the optical disk comprises a non-magnetic, preferably plastic substrate such as the presently utilized polycarbonate with the requisite pits formed therein. For reading compatibility with existing read-only devices it is preferred that the pits be of the same dimension as those of standard optical disks for any of audio, video or computer applications.

Standard optical disks, operate on the basis of the readable reflective difference resulting from the difference in reflectivity of a reflective coating material which is at the bottom of the pits and the surface of the lands therebetween. In contrast thereto, the difference in reflectivity of the present invention is a function of the selective exposure to the laser light of at least two different materials, having different reflectivity characteristics.

Means are provided for permitting the reversible and controllable exposure to the laser light of the different materials with concomitant change in degree of reflectivity. In order that erosion readings be minimized, it is preferred that the difference in reflectivity be in a ratio of at least 3 to 1 and preferably on the order of 6 to 1 or more to provide a signal to noise (S/N) of like ratio.

In accordance with a preferred embodiment of the present invention a first material, contained in the pits, is comprised of a stable and reversible "solid-fluid" phase-change material with a melting point sufficiently above room temperature whereby the material is in the solid state under general reading conditions. The term "fluid", as used herein and throughout the text, in describing the "phase-change" material, encompasses fluid states (not technically phase changes) wherein the material is of a sufficiently low viscosity whereby it is capable of permitting a flowing movement of a second material therethrough. The temperature should additionally be low enough such that amplified laser light, e.g. amplification of the laser used for the reading mode, can be readily utilized to effect the phase change at a relatively rapid rate and whereby relatively rapid solidification of the melted material at room temperature can take place, in conjunction with the cooling effect of the spinning of the disk. Useful phase-change or transition temperatures are in the range of about 110° to 350° F. A second material, contained in the pits, is a magnetically susceptible (attracted or repulsed by a magnetic field), relatively inexpensive metallic substance in a particulate configuration which has a significantly different reflectivity from that of the phase-change material.

All the pits of the optical disk are filled with the phase-change material and sufficient amounts of the magnetically susceptible material to provide a subsantially continuous layer thereof across the pit. The optical disk is operable in the write mode with the application of amplified laser light i.e. heat sufficient to effect the solid-fluid phase change in selected pits, in conjunction with the application of a magnetic field to the same selected pits. The particulate material is moved by the magnetic field through the fluidized phase-change material, either towards or away from the exposed surface of the phase-change material, as desired, with a resultant readable change in reflectivity at the surface of the selected pit. The application of either heat or magnetic field alone is however insufficient to cause the movement of the magnetically susceptible particles. As a result, the optical disk is very stable with respect to unwanted changes in information material contained thereon. Ambient heat alone, though it may melt the phase-change material, does not by itself move the particles and the magnetic field has no substantial effect on the magnetically susceptible particles when the phase change material is in the solid form. As a consequence of the latter characteristic, precision in the application of the magnetic field is of no moment. However, since there is a delay in the reversal of the magnetic field, it is preferred that the write cycle of the optical disk of the present invention be effected in a dual stage. In the first stage the selected area for writing is cleared to the original state (either all exposed magnetically susceptible material or all exposed phase-change material) and in the second stage the individual pits are configured with the requisite exposure of the desired material for providing the desired reflective signal.

Phase-change materials effective in the operation of the present invention include mineral oil fractions composed of solidified paraffin, with a melting point between about 110° and 350° and preferably between about 130° to 200° F. The paraffin must further be stable, i.e. without degradation or breakdown, for at least 2000 solid-fluid and fluid-solid "phase" changes. In accordance with the present invention, the paraffin undergoes a change from a solid to a more viscous or fluid material without the necessity of a complete phase change to a liquid form. Preferably, such stability should extend from 10,000 cycles or more. The paraffin material has the advantage of being economical and has a well documented history of stability in its common uses in cosmetics and candles. The specific temperature characteristics of the paraffin, i.e. the transition temperatures to a fluid viscosity, can be varied over a wide range, as required, by selection of a specific fraction and with the use of doping agents such as ethylene glycol. Other materials suitable for the phase-change material of the present invention include solid hydrogenated fats, hydrogenated estomers, colloidal suspensions, salt solutions, etc. Materials such as paraffin are whitish in the solid form, with a reflectivity of about 30%.

Examples of suitable materials utilizable as the magnetically susceptible particulate components include any of a class of magneto-ferrite materials with the most preferred being gamma ferric oxide and Permalloy matarial (a proprietary nickel-iron alloy) from a standpoint of cost and ease of handling during manufacturing procedures. These materials are darkish with a reflectivity of about 5%. The SNR between the paraffin and magneto-ferrite materials is thus about 6:1. Though somewhat more costly, the Permalloy material is more advantageous for computer and video application though either is useful for all applications. Cost is however not a significant factor in the selection of this component since it is utilized in relatively small quantities. In contrast to the materials currently used in multiple write optical disks, the phase-change and magnetically susceptible metallic materials are not detrimentally susceptible, to any significant degree, to elevated ambient temperature or moisture conditions.

In accordance with the present invention a preferred method for manufacturing the optical disks comprises the steps of forming a plastic substrate with pits at every possible readable location, and filling the pits with both the phase-change material and the magnetically susceptible material. More specifically, the method comprises creating a stamper where every bit is potentially a "1" (all pits). The individual optical disk substrates, preferably composed of a plastic such as polycarbonate, are pressed from the stamper. The polycarbonate substrate disk is then attached to a magnetic plate of at least the same size as the "written" portion of the disk. The magnetically susceptible material, such as Permalloy particles, is sprayed, sputtered or otherwise placed onto the surface of the substrate to form a thin continuous layer while a magnetic field is continuously applied to the disk. The magnetic field serves to pull the Permalloy particles to the bottom of each of the pits and maintain them in such position during the remaining procedures. Thereafter, both the disk and the plate are dipped into a fluidized phase-change material such, as paraffin, with a portion of the fluidized paraffin filling the individual pits above the Permalloy particles. The surface of the disk, with the paraffin and Permalloy material, is thereafter wiped clean or cleaved such as with a doctor blade whereby the paraffin and Permalloy material only remain within the individual pits. The paraffin is then allowed to solidify. The disk then contains, in a preferred embodiment compatible with existing audio, video and computer disks, pits 0.12 microns deep by 0.6 microns diameter. At the bottom of each pit is a layer of Permalloy material 0.04 to 0.06 microns thick covered with the solidified paraffin layer having a thickness of about 0.06 to 0.08 microns. The magnetic plate is separated from the polycarbonate substrate and additional residual paraffin is further peripherally removed by methods such as buffing. The disk is completed, in accordance with currently standard techniques, by covering the surface of the disk with a layer of a protective transparent laminate which, in accordance with the present invention, further serves to retain the Permalloy and paraffin materials within each of the individual pits. Each of the pits accordingly become independently operable reversible cell units.

The write mechanism in accordance with the present invention, utilizes existing laser reading equipment but with two modifications. Magnetic means are provided in conjunction with the laser whereby the magnetically susceptible particles may be selectively moved by the application of a magnetic field (either by attraction or repulsion). The second modification comprises laser amplification means whereby the layer light used for reading is sufficiently amplified to the extent that it achieves an applied temperature sufficient to effect the phase change from a solid to a liquid (or at least a fluid) in the phase-change material. The magnetically susceptible material is then thereby capable of being moved through the fluidized material by the applied magnetic field.

In a preferred embodiment, the magnetic means is an electromagnet triggered simultaneously with the amplified laser light which is positioned adjacent the laser head. A preferred embodiment of the laser light amplification means comprises a lens, containing electrically conductive materials, positioned in the optical path between the laser light source and the disk. It has been recently discovered that laser light transmitted through a charged lens is amplified to an extent dependent upon the applied charge. Accordingly, during the write cycle a sufficient charge is applied to the lens to provide the laser light amplification to effect the requisite solid-fluid phase change. During the read cycle, the uncharged lens has no effect on the laser light. In another, less preferred embodiment, a second, higher powered laser is indenpendently utilized for the writing mode.

Figure 1:
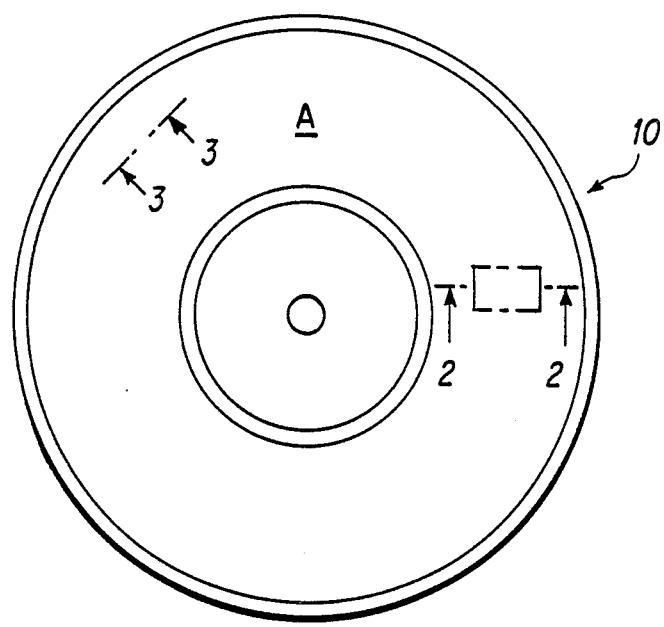
FIG. 1 is a plan view of an optical disk made in accordance with the present invention with FIG. 1a being thereof enlarged for clarity.
Figure 1A:
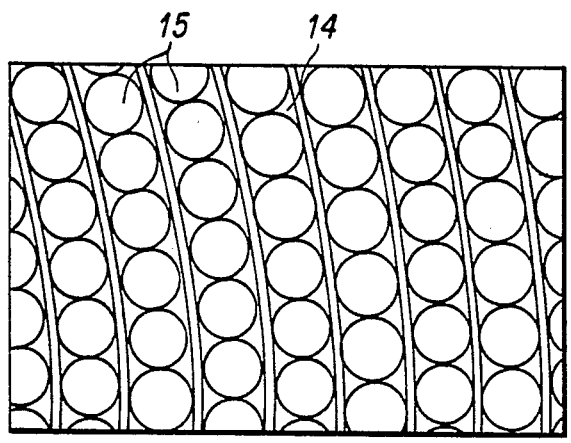
Figure 2:
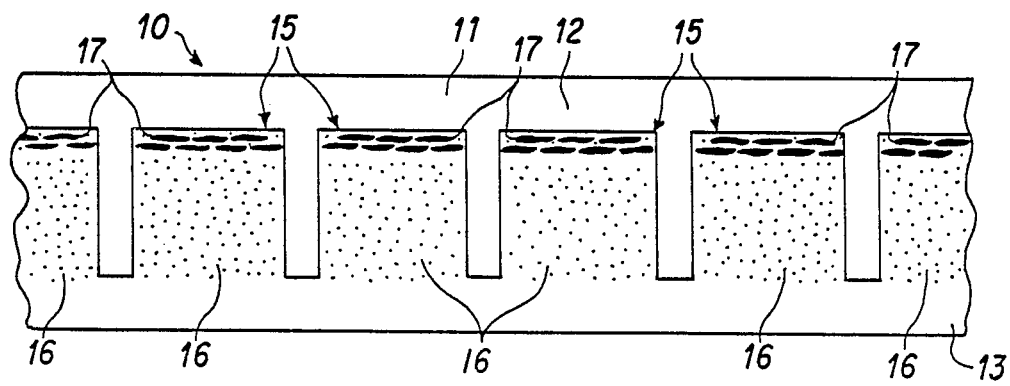
FIG. 2 is a partial section view of the optical disk of FIG. 1 taken along line 2—2 shown in the initial all "land state"

With specific reference to the drawings, the optical disk 10 in FIGS. 1 and 1a is readable on side A which is configured with tracks 14 having pits 15 therealong. As more clearly shown in FIG. 2, the optical disk 10 is comprised of a polycarbonate substrate 11, covered with an aluminized layer 12 and is envelopingly protected by a transparent plastic layer 13 which encloses the entire disk. Pits 15 are situated at every readable position with each being substantially filled with a phase-change material 16 and a thin layer of particulate magnetically susceptible material 17 which substantially spans the cross section of each of pits 15. As shown in FIG. 2, all of the pits are configured for an initial writing mode with the pits all having a surface reflectivity of the solidified phase change material. In a visual comparison, without magnification, the optical disks of the prior art are the same as optical disk 10 of the present invention. FIGS. 3a and 3b however depict the indicated information written on a disk 10A of the prior art as compared to the same information written on disk 10 of the present invention. In prior art disk 10A the its 15A the more reflective lands 15B supply the requisite readable difference in reflectivity. Lands 15B of disk 10A correspond to pits 15 in disk 10 wherein the magnetically susceptible particles 17 are at the bottom thereof with the more reflective phase change material 16 being exposed to the laser light. Pits 15A correspond to the lesser reflective pits 15' in disk 10 wherein the magnetically susceptible particles 17 have been brought to the surface of the phase change material 16 for exposure to the laser.

During the write cycle, in accordance with the present invention, (as schematically shown in FIG. 4) with the use of the apparatus of FIG. 5, a portion 20, of the disk 10, to be written on, is brought to the initial or erased state. The laser light 21 is directed on pits 15 through lens 22. An electric current is applied to the lens 22 by power supply 23 with transformer 25 thereby amplifying the laser light 21 sufficiently to fluidize the phase-change material 16 (the dark magnetically susceptible particles 17 are both heat absorptive and good heat conductors and do not impede heating of the phase-change material 16). Simultaneously therewith, or within a very short period thereafter, magnetic element 24 is activated to impress a magnetic field on the selected portion 20. The particulate material 17 is moved through the fliudized phase-change material 16 into the initial or erased state by the magnetic field. During the writing cycle thereafter, magnetic element 24 is activated in conjunction with fluidizing of the phase-change material 16 to selectively bring the particulate material 17 to the surface of the disk, into exposure the laser, at positions requiring lower reflectivity. The phase-change material and magneticaly susceptible particles are completely contained within each of the individual pits 15 by the protectively enveloping layer 13 whereby there is no loss of material from the individual pits. Reflected light is read in a manner similar to that of current commercial laser reading devices. Because of the configuration of pits at every readable location and for greater efficiency, tracking of the laser light is based upon the land space between adjacent tracks as opposed to some currently utilized methods of tracking on the lands between the pits.

It is understood that the above description and drawings are illustrative of the present invention and that changes in method and variation in structures may be made without departing from the scope of the present invention as defined in the following claims.

What is claimed is:

1. An optical disk, readable by a laser reading device, capable of undergoing multiple write cycles and comprising a substrate member for first and second materials, having specific optical reflectivities substantially differing from each other, with said disk further comprising means for permitting a selective exposure, to the laser of said reading device, of either of said first or second materials at selected locations on said disk.

2. The optical disk of claim 1 wherein said substrate is configured with pits at every location thereon, readable by said laser reading device, and wherein each of said pits is filled with a combination of said first and second materials.

3. The optical disk of claim 2 wherein said first material comprises a stable material capable of undergoing at least 2000 cycles between solid and fluid phases without significant degradation, and said second material comprises a layer of a particulate material capable of being magnetically attracted or repelled and thereby moved through said first material when said first material is in said fluid phase, and wherein said first material, when in the solid state, has a specific reflectivity value readably different, by said laser reading device, from that of said second material.

4. The optical disk of claim 3 wherein said stable material changes from a solid to a fluid state and from a fluid to a solid state at a temperature ranging between about 110° F. to 350° F.

5. The optical disk of claim 4 wherein the specific reflectivity value of said stable material is at least about three times that of said particulate material.

6. The optical disk of claim 4 wherein said first material is selected from one or more of the group consisting of paraffin, solid hydrogenated fats, hydrogenated estomers, colloidal suspensions and salt solutions.

7. The optical disk of claim 6 wherein said first material is a paraffin.

8. The optical disk of claim 7 wherein ethylene glycol is added to said paraffin.

9. The optical disk of claim 4 wherein said particulate material is metallic and is comprised of at least one magneto-ferrite material.

10. The optical disk of claim 9 wherein said magneto-ferrite material is selected from the group consisting of gamma ferric oxide and nickle-iron alloys.

11. An optical disk, readable by a laser reading device, capable of undergoing multiple write cycles and comprising a plastic substrate member configured with pits at every location thereon, readable by said laser reading device, and wherein each of said pits is filled with a combination of first and second materials, having specific optical reflectivity values, wherein said first material comprises a stable paraffin material capable of undergoing at least 2000 cycles between solid and fluid phases, at a temperature ranging between about 130° F. to 200° F., without significant degradation, and said second material comprises a layer of a particulate magneto ferrite metallic material capable of being magnetically attracted or repelled and thereby moved through said first material when said first material is in said fluid phase, and wherein said first material, when in the solid state, has an optical reflectivity value at least three times that of said second material.

12. The optical disk of claim 11 wherein said plastic substrate member is comprised of polycarbonate with said plastic substrate member being covered with a transparent protective layer which causes each of said pits to become individually enclosed isolated cells.

13. A method for manufacturing an optical disk, readable by a laser reading device, comprising the steps of:
    (a) forming pits in a substrate member at substantially every available location, readable by said laser reading device;
    (b) filling said pits with first and second materials having substantially different optical reflectivity values; and
    (c) providing means for reversibly exposing either of said materials to said laser reading light at selected locations on said substrate member.

14. The method of claim 13 wherein said pits are formed by being stamped into a surface of said substrate member.

15. The method of claim 14 wherein said first material comprises a stable material capable of undergoing at least 2000 cycles between solid and fluid phases, at a temperature between about 110° to 350° F., without significant degradation; and said second material comprises a layer of a particulate metallic material capable of being magnetically attracted or repelled and thereby moved through said first material when said first material is in said fluid phase, wherein said pits are filled with said first and second materials by the steps of:
    (a) attaching a magnetic plate to said substrate on the surface thereof obverse to said stamped surface;
    (b) coating said stamped surface with a thin continuous layer of said metallic material, while a magnetic field is continuously applied to the disk whereby said metallic material is pulled to the bottom of each of the pits;
    (c) fluidizing said first material and coating said stamped surface and filling said pits therewith while said metallic material is held at the bottom of said pits by said magnetic field;
    (d) removing said first and second materials from said stamped surface whereby said first and second materials are present only in said pits;
    (e) solidifying said first material; and
    (f) covering the stamped surface with a layer of a protective transparent laminate whereby said first and second materials are retained in each of said pits whereby said pits become independent cell units.

16. An apparatus for reading information from the optical disk of claim 3 and for reversibly writing on said disk, said apparatus comprising a laser light source used in reading said information, characterized in that said apparatus further comprises laser light writing means having a power output greater than said laser light source utilized for said reading and sufficient to effect said solid to fluid phase change of said first material; said apparatus further comprising magnetic means for moving said particulate metallic material through said first material when said first material is in said fluid phase.

17. The apparatus of claim 16 wherein said magnetic means comprises an electromagnetic element situated adjacent said laser light source.

18. The apparatus of claim 17 wherein said laser light writing means comprises an optical lens interposed between said laser light source and said disk, and means for selectively applying an electric current to said lens with the power output of said laser light being increased thereby.

19. The apparatus of claim 16 wherein said laser light writing means comprises a second laser light source having said greater power output and said magnetic means comprises an electromagnetic element situated adjacent said second laser light source.

* * * * *